United States Patent [19]
Sekine

[11] Patent Number: 5,822,128
[45] Date of Patent: Oct. 13, 1998

[54] PROJECTION LENSES FOR DISPLAY ELEMENTS AND PROJECTION SYSTEMS COMPRISING SAME

[75] Inventor: Atushi Sekine, Kasukabe, Japan

[73] Assignee: Nikon Corporation, Tokyo, Japan

[21] Appl. No.: 821,812

[22] Filed: Mar. 21, 1997

[30] Foreign Application Priority Data

| Mar. 22, 1996 | [JP] | Japan | 8-066191 |
| Sep. 17, 1996 | [JP] | Japan | 8-245204 |

[51] Int. Cl.⁶ .............. G02B 9/34; G02B 9/12
[52] U.S. Cl. ........................ 359/650; 359/651
[58] Field of Search .................... 359/649, 650, 359/651, 715, 716

[56] References Cited

U.S. PATENT DOCUMENTS

| 4,697,892 | 10/1987 | Betensky | 359/650 |
| 5,519,537 | 5/1996 | Shikama | 359/649 |
| 5,633,757 | 5/1997 | Park | 359/649 |

FOREIGN PATENT DOCUMENTS

| 5-45582 | 2/1993 | Japan . |
| 5-203871 | 8/1993 | Japan . |
| 06082690 A | 3/1994 | Japan . |
| 06148518 A | 5/1994 | Japan . |

*Primary Examiner*—Scott J. Sugarman
*Attorney, Agent, or Firm*—Klarquist Sparkman Campbell Leigh & Whinston, LLP

[57] ABSTRACT

Telecentric retrofocus lenses and projection systems comprising such lenses are disclosed. The lenses are compact and provide a wide field of view (>70°) with effective distortion correction. The lenses comprise, in order from the image side, a first lens group G1, comprising an aspheric lens having a negative focal length, an aperture, and a second lens group having a positive focal length and having a lens that has maximum refractive power among the lenses of the second lens group. Conditions apply to the ratio of the focal lengths of the first and second lens groups and the distance between the aperture and the focal length of the lens within the second lens group having maximum refractive power. The conditions effectively provide compact, wide-field, low-aberration images. Projection systems using these lenses are also disclosed.

29 Claims, 6 Drawing Sheets

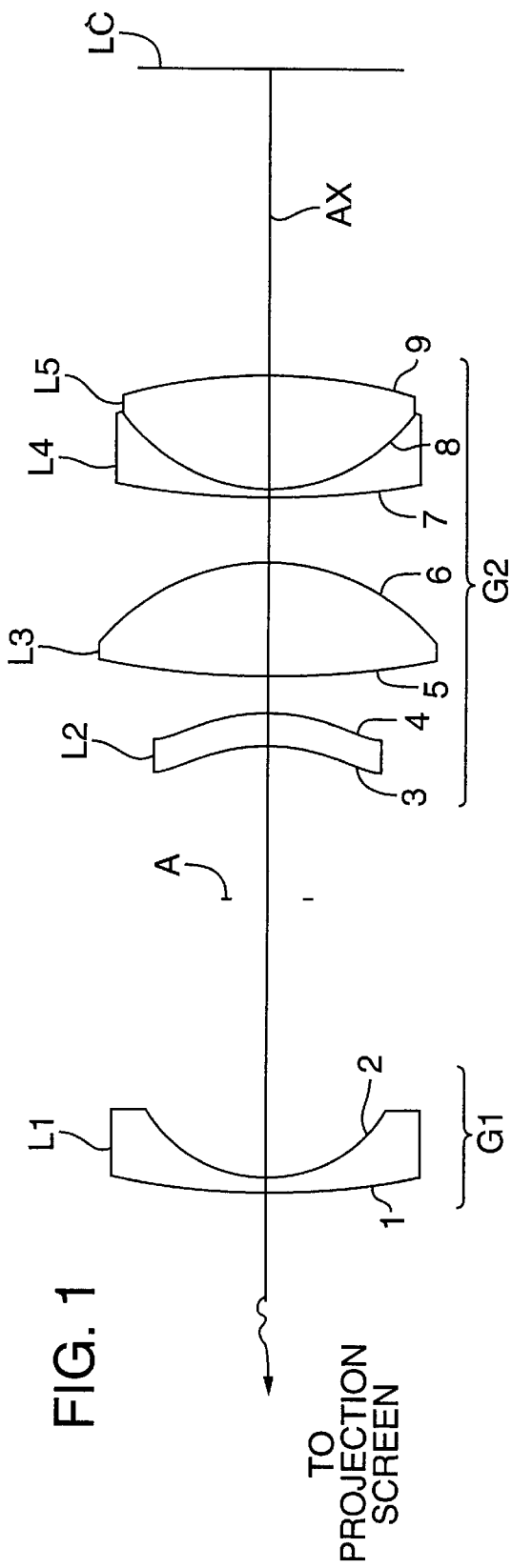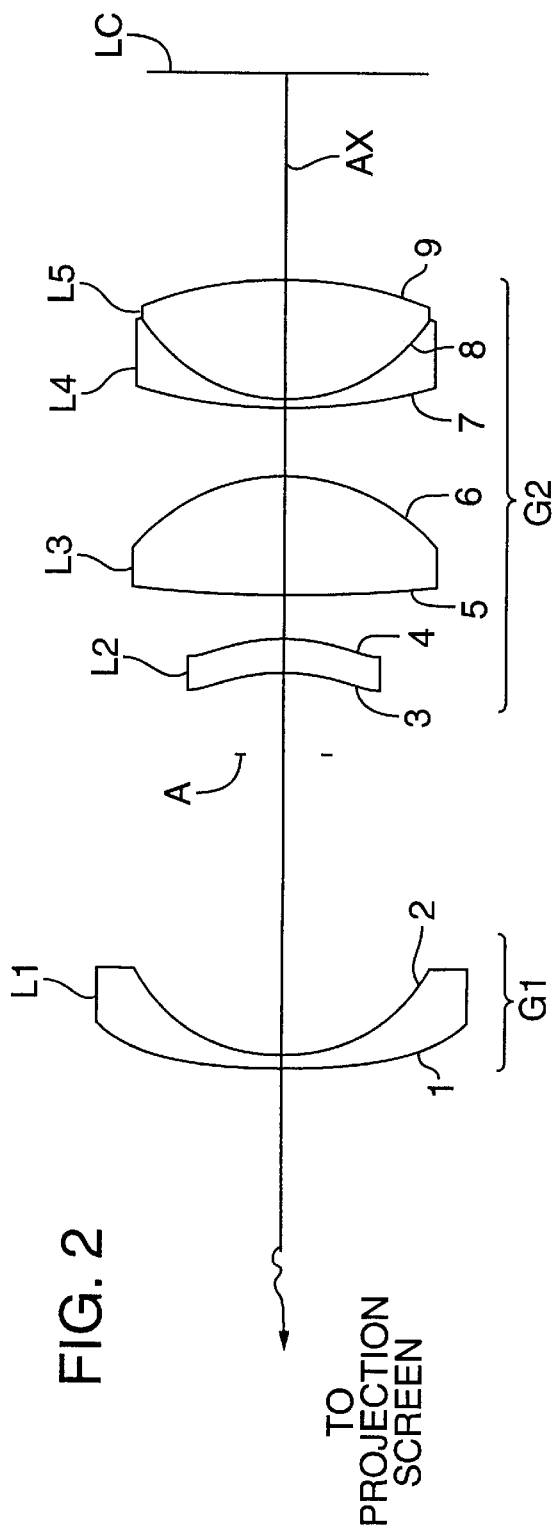

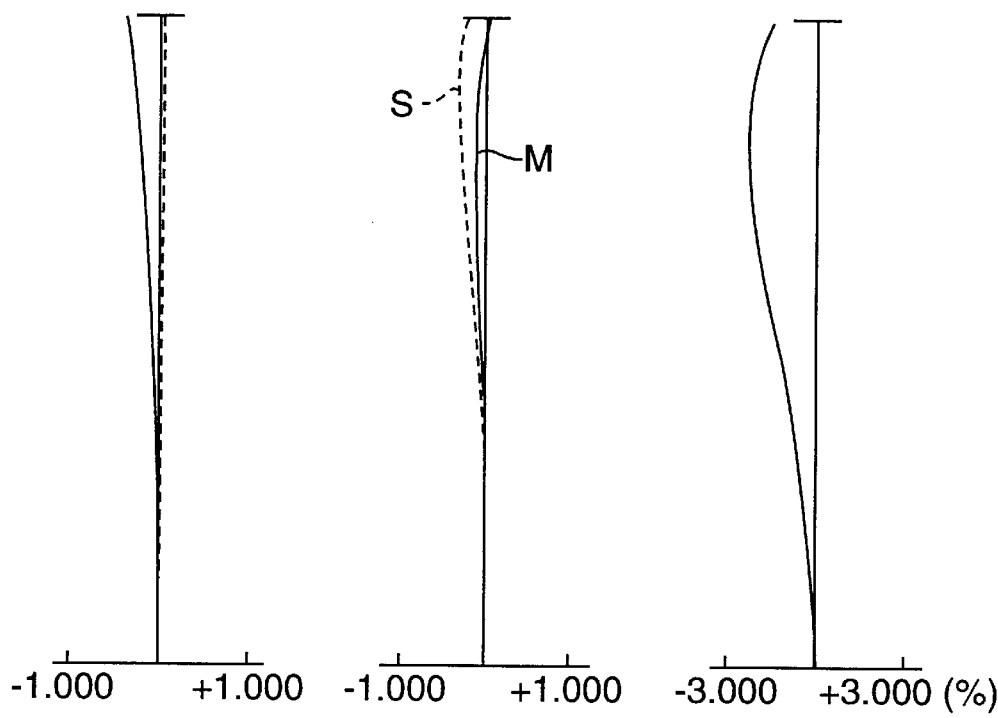
FIG. 5A N.A. = 0.13
FIG. 5B Y = 18.00
FIG. 5C Y = 18.00
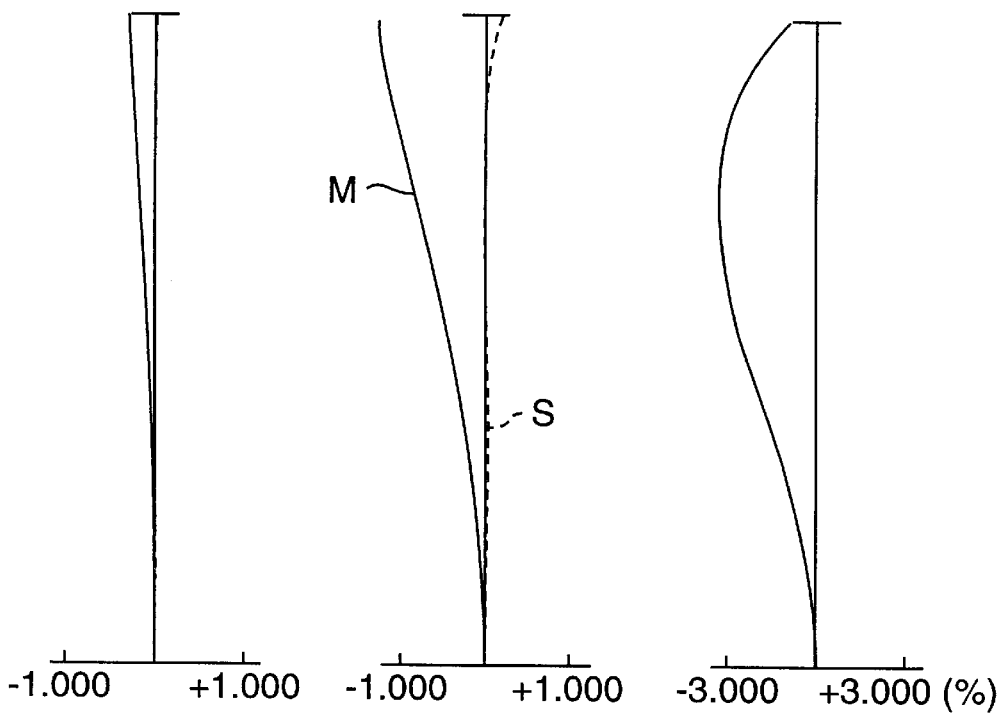
FIG. 6A N.A. = 0.15
FIG. 6B Y = 18.00
FIG. 6C Y = 18.00

N.A. = 0.12

Y = 18.00

Y = 18.00

N.A. = 0.13

Y = 18.00

Y = 18.00

PROJECTION LENSES FOR DISPLAY ELEMENTS AND PROJECTION SYSTEMS COMPRISING SAME

FIELD OF THE INVENTION

The invention concerns projection lenses suitable for a projecting an image of a display element such as a liquid-crystal display panel onto a screen. In particular, the invention concerns a retrofocus projection lens having a negative lens group and a positive lens group.

BACKGROUND OF THE INVENTION

Projection systems that project images of cathode-ray tubes (CRTs) onto large screens have been widely used for many years. More recently, projection systems that project an image of a liquid-crystal panel or other light valve instead of a CRT have been developed.

FIG. 12 shows a prior-art projection system using a liquid-crystal panel. In FIG. 12, a dichroic mirror 101 reflects a red component (R-component) of light from a light source 100 and transmits green and blue components (G-component and B-component, respectively). The R-component is reflected by a mirror 110 and is then incident to a liquid-crystal panel 120. A dichroic mirror 102 receives the transmitted G- and B-components from the dichroic mirror 101. The dichroic mirror 102 transmits the G-component of the incident light and reflects the B-component. The B-component is reflected to a liquid-crystal panel 121 and the G-component is transmitted to a liquid-crystal panel 122. The three liquid-crystal panels 120, 121, 122, modulate the R-component, the B-component, and the G-component of the light from the light source 100, respectively.

The modulated R-component and B-component are combined by a dichroic mirror 103; the R-component and the B-component are then combined with the G-component by a dichroic mirror 104. After the three components are combined, the combined, modulated components are projected onto a projection screen (not shown) by a projection lens 130, forming a color image.

Projection systems using liquid-crystal panels face additional problems in comparison with projection systems using cathode ray tubes (CRTs). In a CRT-based system, distortion produced in the projection lens or lenses can be corrected by appropriately predistorting the images formed on the CRTs. In contrast, in a projection system using liquid-crystal panels, images on the liquid-crystal panels cannot be effectively predistorted because of the matrix addressing of the liquid-crystal panel. The addressing electrodes are generally evenly spaced across the liquid-crystal panel and this spacing is fixed. Thus, predistortion is difficult. In addition, because modulation by a liquid-crystal panel depends on the angle of incidence of the input light, a liquid-crystal panel is preferably used with light incident nearly perpendicular to the liquid-crystal panel. Therefore, a projection lens for a projection system for liquid-crystal panels should have low distortion and be telecentric, or nearly telecentric, on the liquid-crystal side.

Prior-art projection systems for projecting liquid-crystal panels have used retrofocus (inverted telephoto) lenses that have a front lens group with negative refractive power and a rear lens group with positive refractive power. However, retrofocus lenses tend to suffer from off-axis aberrations such as distortion, astigmatism, and lateral chromatic aberration. These aberrations are especially difficult to correct in lenses with the low f-numbers required for projecting bright images.

Projection lenses for liquid-crystal panels are preferably compact. In a conventional telecentric retrofocus lens, the chief ray of the ray bundle from an off-axis point is refracted so that it is parallel to the optical axis of the lens. This causes the back focal lengths of such projection lenses to be large. Because of the large back focal length, the projection system is large. In order to keep the projection system compact, the size of the back focal length must be controlled.

Because a liquid-crystal panel is addressed with matrix electrodes arranged in a uniform pattern, electronic distortion correction is difficult. As a result, distortion produced by the projection lens must be minimized and it is difficult to widen the field of view of the retrofocus lens. Wide-field lenses provide large projected images even for short projection lengths and therefore are desirable for overall compactness.

SUMMARY OF THE INVENTION

The present invention provides retrofocus projection lenses having a relatively short back-focal length and at least near telecentricity. The projection lenses have reduced distortion, a wide field of view, and are compact. Such lenses are suitable for producing high quality projected images of liquid-crystal panels in compact projection systems.

* A suitable retrofocus projection lens comprises, on an optical axis and beginning nearest the projection screen, a first lens group G1, an aperture A, and a second lens group G2. The first lens group comprises preferably a single bi-aspheric lens having negative focal length $f_1$. The second lens group G2 comprises at least one positive single lens and has a focal length $f_2$. The second lens group G2 can have more than one lens with a positive focal length; a lens of the lens group G2 with the smallest positive focal length (greatest positive refractive power) $L_{max}$ has a positive focal length $f_{2max}$. The lens $L_{max}$ is placed a distance L from the aperture A. To achieve the desired lens properties, the focal lengths $f_1$, $f_2$, and $f_{2max}$ should satisfy the following conditions:

$$0.5 < |f_1/f_2| < 2$$

$$0.8 < |f_{2max}/L| < 2.5$$

It is further preferable that the lens of the second lens group G2 closest to the aperture A be an aspheric lens. This lens may have either one or two aspheric surfaces.

In one embodiment of the invention, the second lens group G2 further comprises a positive focal length lens placed close to a negative focal length lens, with the negative focal length lens placed closer to the aperture A. These lenses are preferably cemented to form a cemented doublet.

In another embodiment of the invention, the lens $L_{max}$ is a single lens (singlet). It is further preferable that the following condition be satisfied wherein the axial distance between the first lens group G1 and the aperture is D:

$$0.5 < D/|f1| < 1.2$$

BRIEF DESCRIPTION OF THE DRAWINGS

FIG. 1 is an optical diagram showing specific features of Example Embodiment 1.

FIG. 2 is an optical diagram showing specific features of Example Embodiment 2.

FIGS. 5A–5C provide plots of spherical aberration and offense against the sine condition (OSC), astigmatism, and distortion, respectively, for Example Embodiment 1.

FIGS. 6A–6C provide plots of spherical aberration, astigmatism, and distortion, respectively, for Example Embodiment 2.

DETAILED DESCRIPTION

Figure 3:
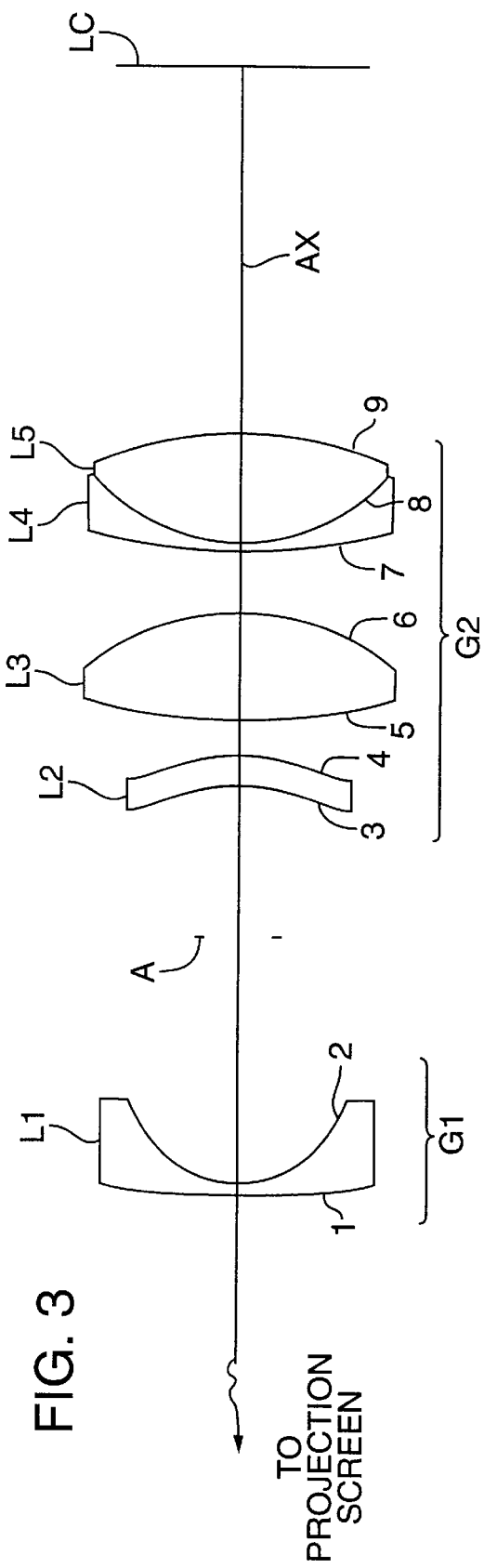
FIG. 3 is an optical diagram showing specific features of Example Embodiment 3.

Not intending to be limiting, FIGS. 1–4 show Example Embodiments of projection lenses according to the present invention. Such projection lenses project an image of a liquid-crystal panel LC (or of multiple liquid-crystal panels) onto a projection screen (not shown).

For convenience in describing the Example Embodiments of FIGS. 1–4, the side of the lenses facing the liquid-crystal panel LC is called the "object side." Similarly, the side of the lenses facing the projection screen (not shown) is called the "image side." The various surfaces of the lenses of the Example Embodiments are accordingly referred to as "object-side facing" or "image-side facing." As a further simplification, the liquid-crystal panel LC is referred to as the "object" and the image of the liquid-crystal panel LC on the projection screen is referred to as the "image."

A sign convention for lens-surface radius of curvature is chosen such that a surface whose center of curvature is on the image side of the surface has a negative radius and curvature; a surface whose center of curvature is on the object side of the surface has positive radius and curvature. In addition, lenses having positive focal lengths are called "positive" lenses and have positive refractive power; lenses having negative focal lengths are called "negative" lenses and have negative refractive power.

By way of example, FIG. 1 shows an optical layout of a projection lens of Example Embodiment 1. The Example Embodiment 1 comprises, starting with the lens closest to the image (left side in the drawing) and proceeding in order toward the object, a first lens group G1 with negative refractive power, an aperture A, and a second lens group G2 with positive refractive power. As shown in FIG. 1, the Example Embodiment 1 is arranged to project an image of the liquid-crystal panel LC onto a projection screen (not shown).

In Example Embodiment 1, the first lens group G1 comprises a single bi-aspheric lens L1 (bi-aspheric means that both surfaces of the lens are aspheric surfaces). The second lens group G2 comprises lenses L2, L3, L4, L5. At least one of the lenses L2, L3, L4, L5 has positive refractive power. The centers of curvatures of the lenses L1–L5 lie on an optical axis AX.

The projection lens of Example Embodiment 1 further satisfies Conditions (1) and (2) below in which $f_1$ is the focal length of the bi-aspheric lens L1 of the first lens group G1, $f_2$ is the focal length of the second lens group G2, $f_{2max}$ is the focal length of the lens of the lens group G2 (consisting of the lenses L1, L2, L3, L4, L5) with the largest positive refractive power (called the lens "$L_{2max}$"), and the distance between the lens with focal length $f_{2max}$ and the aperture A is denoted "L." With these definitions, the Conditions (1) and (2) are:

$$0.5 < |f_1/f_2| < 2 \quad (1)$$

$$0.8 < |f_{2max}/L| < 2.5 \quad (2)$$

Distortion in the first lens group G1 is corrected by using the single bi-aspheric lens L1 for the first lens group G1. This minimizes the number of lenses in the first lens group G1 and results in a small, compact lens. In addition, the bi-aspheric lens L1 provides aberration correction.

The Conditions (1)–(2) provide a desirable combination of projection-lens properties. If the upper limit of Condition (1) is exceeded, i.e., if $|f_1/f_2| \geq 2$, then the distance between the first lens group G1 and the second lens group G2 must be increased to correct field curvature. This causes the first lens group G1 to be large and the entire projection lens to increase in size. The upper limit of Condition (1) therefore provides compactness. If the lower limit of Condition (1) is not satisfied, i.e., if $|f_1/f_2| \leq 0.5$, then barrel distortion and (negative) spherical aberration are large, making aberration correction difficult.

Condition (2) defines conditions for maintaining telecentricity, correcting aberrations, and keeping the projection lens compact. If the lower limit of Condition (2) is exceeded, i.e., if $|f_{2max}/L| \leq 0.8$, then the lens $L_{2max}$ causes a principal ray that passes through the center of the aperture to be refracted so that it converges toward the optical axis AX. In order to maintain telecentricity under such a condition, a negative lens must be added to the second lens group G2 to refract the principal ray so that it is again parallel to the optical axis. Such a lens arrangement is complex and large. If the lower limit of Condition (2) is violated, then the lens $L_{2max}$ is excessively large and the entire lens system is excessively large.

If the upper limit of Condition (2) is violated, i.e., if $|f_{2max}/L| \geq 2.5$, then the lens $L_{2max}$ causes a principal ray that passes through the center of the aperture to be refracted so that it diverges from the optical axis AX. In order to maintain telecentricity under such a condition, the second lens group G2 must include a lens with strong positive refractive power. Such a lens makes the arrangement of lenses more complex and less compact.

The second lens group G2 preferably includes at least one aspheric lens placed closer to the aperture A than any other lens of the group G2. By placing the second lens L2 close to the aperture, spherical aberration and coma aberration can be corrected.

Because the first lens group G1 preferably comprises a single bi-aspheric lens L1, it is difficult to correct chromatic aberrations in the first lens group G1. However, with negative and positive lenses placed close together within the second lens group G2 and on the object side of the lens group G2, lateral and axial chromatic aberrations may be corrected. The negative and positive lenses can be placed in proximity to one another or they can be cemented together to form a cemented doublet.

It is preferable that a single lens of the second lens group G2 provide most of the refractive power of the second lens group G2. If two or more positive lenses in the second lens group G2 provide most of the refractive power of the second lens group G2, then correcting spherical aberration and off-axis aberrations is difficult.

It is also preferable that Condition (3) below be met. In Condition (3), the focal length of the first lens group G1 is $f_1$ and the distance between the first lens group G1 and the aperture is D.

$$0.5 < D/|f_1| < 1.2 \qquad (3)$$

Condition (3) provides for combining aberration correction and compactness when the first lens group G1 comprises a single negative lens.

If the upper limit of Condition (3) is exceeded (i.e., if the distance D is too large), then aberration correction is easier. However, there is a concomitant undesirable increase in the size of the projection-lens system. If the lower limit of Condition (3) is not satisfied (i.e., if the distance D is too small), then aberration correction is difficult.

Figure 9:
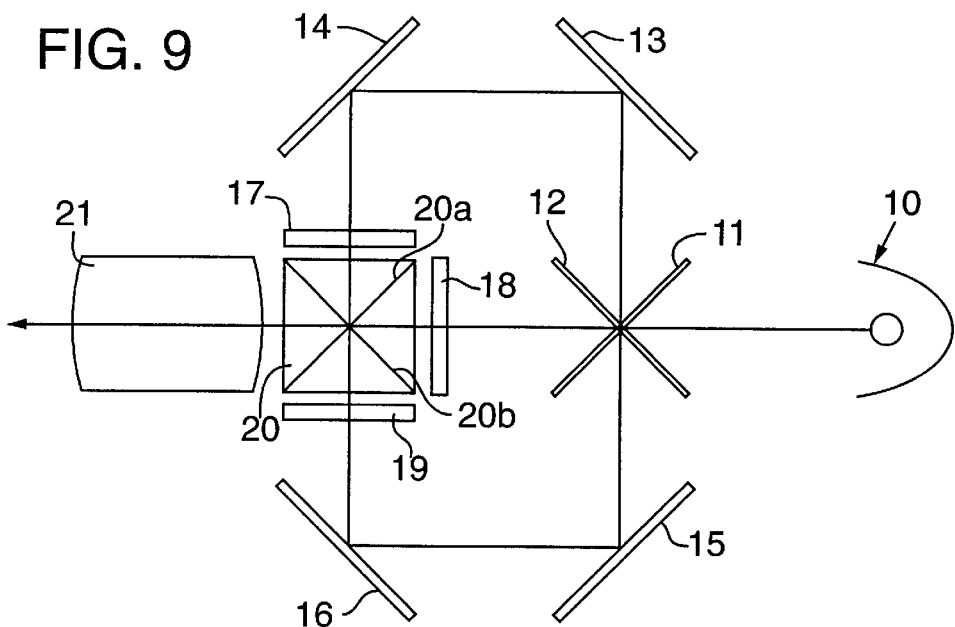
FIG. 9 shows an arrangement of a projection system according to a first embodiment of the present invention.
Figure 10:
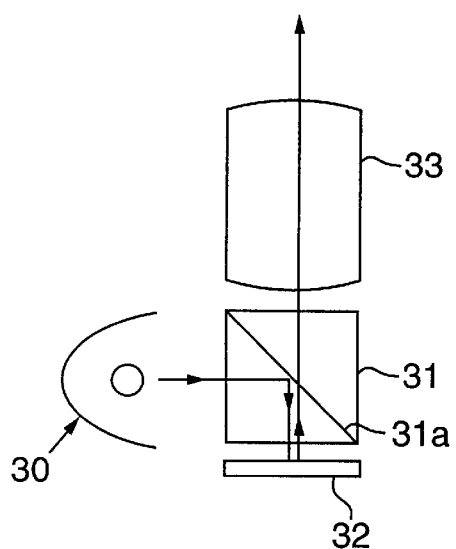
FIG. 10 shows an arrangement of a projection system according to a second embodiment of the present invention.
Figure 11:
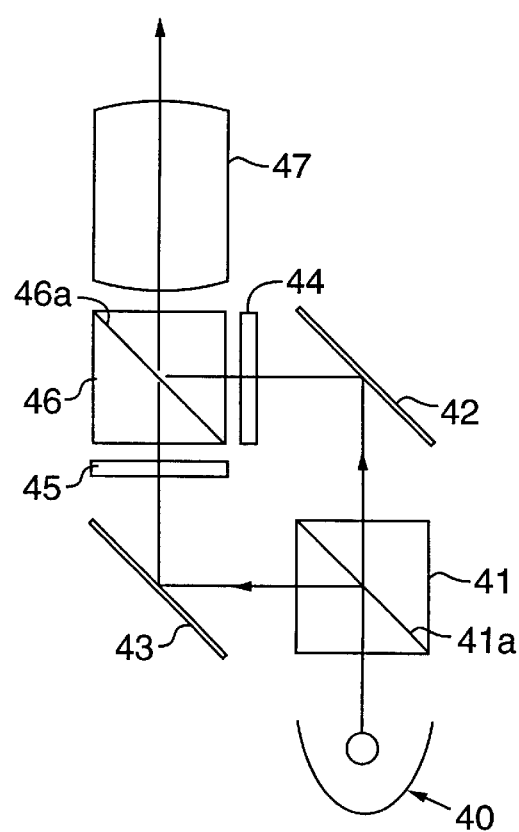
FIG. 11 shows an arrangement of a projection system according to a third embodiment of the present invention.
Figure 12:
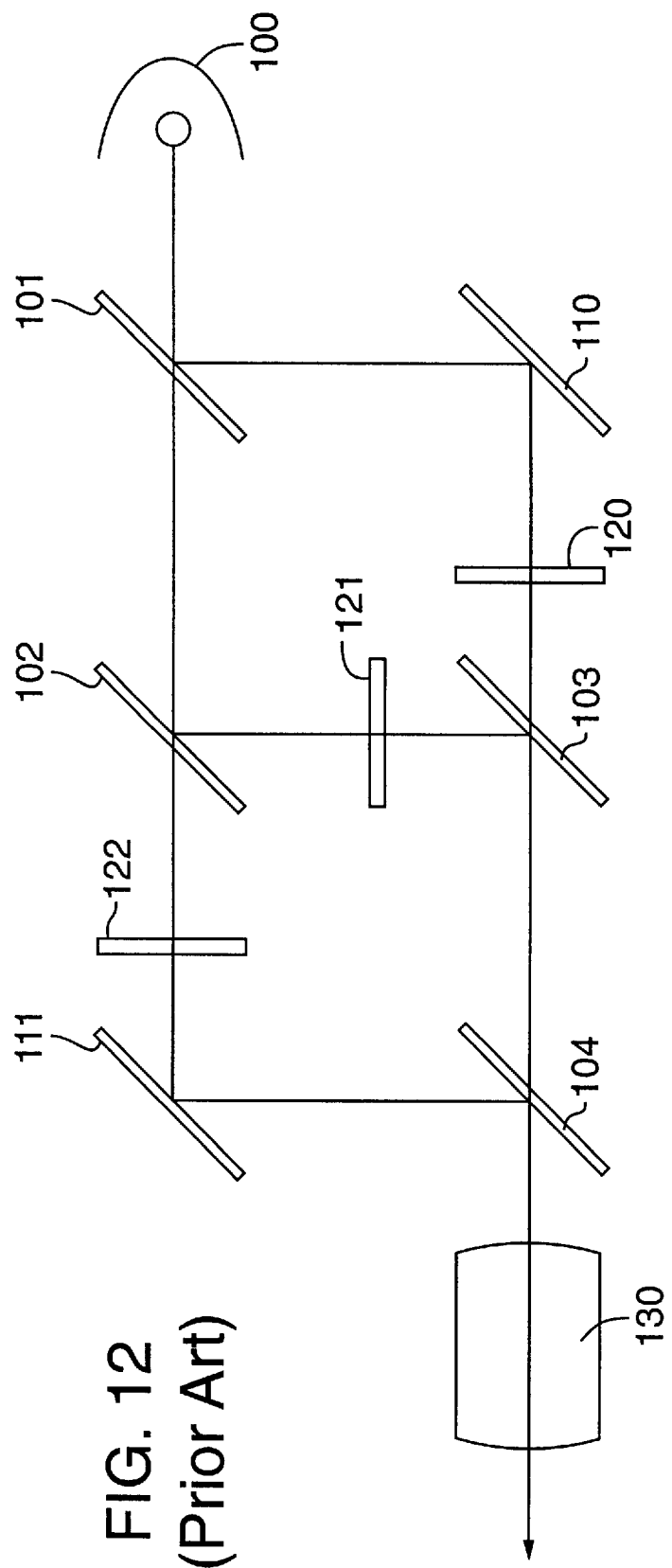
FIG. 12 shows the arrangement of a prior-art projection system.

Representative embodiments of projection systems each comprising a projection lens of the invention are depicted in FIGS. 9–11. In FIG. 9, white light emitted by a light source 10 reaches a crossed-dichroic beamsplitter comprising a red-component reflecting (R-reflecting) dichroic mirror 11 and a blue-component reflecting (B-reflecting) dichroic mirror 12. The crossed-dichroic beamsplitter thus separates the R- and B-components from the green component (G-component). After the R-component is reflected by the R-reflecting dichroic mirror 11, the R-component is further reflected by two mirrors 13, 14. The R-component is then incident to a transmission liquid-crystal panel 17. After separation by the crossed-dichroic beamsplitter, the B-component is reflected by mirrors 15, 16 and is then incident to a transmission liquid-crystal panel 19. The G-component transmitted through the crossed-dichroic beamsplitter is incident on a transmission liquid-crystal panel 18.

The liquid-crystal panels for the color components 17, 18, 19 display image information. The light transmitted by the liquid-crystal panels 17, 18, 19 for the color components is modulated in response to image information.

After the separate color components are transmitted by the corresponding liquid-crystal panels, they enter a crossed-dichroic beamsplitter 20. The crossed-dichroic beamsplitter 20 is constructed of right-angle prisms arranged with an R-component reflecting (R-reflecting) dichroic surface 20a and a B-component reflecting (B-reflecting) dichroic surface 20b that are crossed. The R-component, after modulation by the transmission liquid-crystal panel 17, is reflected toward a projection lens 21 by the R-reflecting dichroic surface 20a.

The B-component, after modulation by the transmission liquid-crystal panel 19, is reflected to the projection lens 21 by the B-reflecting dichroic surface 20b. Similarly, the G-component is modulated by the transmission liquid-crystal panel 18 and is transmitted by the crossed-dichroic prism 20 to the projection lens 21. Thereafter, the color components are projected onto a screen (not shown in the figure) by the projection lens 21. An image combining the color components modulated by the corresponding liquid-crystal panels is formed on the screen.

In the FIG. 10 embodiment of a projection system according to the present invention, white light emitted by a light source 30 enters a polarizing beamsplitter (PBS) 31. The PBS 31 separates the incident light into P-polarized light and S-polarized light. The P-polarized light is transmitted by a polarizing layer 31a of the PBS 31 and is not used; the S-polarized light is reflected by the polarizing layer 31a to a reflecting liquid-crystal panel 32.

The reflecting liquid-crystal panel 32 is an electrically addressed, reflecting display element. The reflecting liquid-crystal panel 32 has a nonlinear switching element for switching each picture element (pixel). Thin film transistors (TFTs) are one common type of nonlinear switching element. An electrical-image signal switches each switching element of the reflecting liquid-crystal panel 32, thereby providing optical modulation and causing the liquid-crystal panel to be switched corresponding to the electrical image signal. Light reflected from the reflecting liquid-crystal panel 32 is used to from an image corresponding to the electrical-image signal. Color filters are arranged in areas corresponding to the pixels, permitting formation of a full-color image.

The reflecting liquid-crystal panel 32 modulates the incident S-polarized light by changing its state of polarization. The reflecting liquid-crystal panel 32 reflects the modulated light back to the PBS 31. The polarizing layer 31a reflects the S-polarized component of the reflected light so that it is discarded. The polarizing layer 31a transmits the P-polarized component of the modulated light; this component continues on to a projection lens 33. The projection lens 33 forms an image of the reflecting liquid-crystal panel 32 on a projection screen (not shown in the figure).

In the FIG. 11 embodiment of a projection system according to the present invention, white light from a light source 40 is incident to a polarizing beamsplitter 41 (PBS). The PBS 41 separates the white light into P-polarized light and S-polarized light. A polarizing layer 41a transmits the P-polarized light and reflects the S-polarized light. The transmitted P-polarized light is reflected by a mirror 42 so that it is incident to a transmissive liquid-crystal panel 44. The reflected S-polarized light is reflected by a mirror 43 and is incident to a transmissive liquid-crystal panel 45.

The transmissive liquid-crystal panel 44 provides optical modulation in response to luminance signals from an electrical image signal; the transmission liquid-crystal panel 45 provides optical modulation in response to color signals from the electrical image signal. The transmissive liquid-crystal panel 43 has color filters placed in regions corresponding to pixels. Modulated light from the transmission liquid-crystal panel 45 contains a full-color representation of the electrical image signal.

The modulated light from the transmissive liquid-crystal panel 44 (corresponding to luminance) is incident to a polarizing beamsplitter (PBS) 46. The S-component of the modulated light from the transmissive liquid-crystal panel 44 is reflected by a polarizing layer 46a to a projection lens 47; the P-polarized component is transmitted by the polarizing layer 46a and is not used. The modulated light from the transmissive liquid-crystal panel 45 (corresponding to color) is incident to the PBS 46. The PBS 46 transmits the P-polarized component of the modulated light from the transmissive liquid-crystal panel 45 to a mirror 43 that reflects the P-polarized component to the projection lens 47; the PBS 46 reflects the S-polarized component which is not used. Modulated light from the transmissive liquid-crystal panels 44, 45 is superimposed on a projection screen (not shown) by the projection lens 47. The projection lens 47 projects an image that is a combination of the images of the transmissive liquid-crystal panels 44 and 45. The image on the projection screen is a combination of modulated light from transmissive liquid-crystal panels 44, 45 corresponding to color and luminance electrical image signals. This combination permits a brighter image to be projected on the projection screen.

Each of the projection lenses of the Example Embodiments of FIGS. 1–4 comprises, on an optical axis AX and starting on the image side, a first lens group G1 with negative refractive power, an aperture A, and a second lens group G2 with positive refractive power. The first lens group G1 comprises a meniscus aspheric positive lens L1 with a convex surface facing the object side. In Example Embodiments 1–3 (FIGS. 1–3, respectively), the second lens group G2 comprises (starting on the image side) a meniscus aspheric positive lens L2 with a concave surface facing the image side, a positive lens L3 with a strong concave curvature facing the object side, and a cemented doublet including lenses L4, L5. The lens L4 is a negative meniscus lens with a concave surface facing the object side. The lens L5 is a positive lens with a strong curvature facing the image side. In Example Embodiment 4 (FIG. 4), the second lens group G2 comprises a double-convex aspheric positive lens L2 and cemented lenses L3, L4 comprising a negative meniscus lens L3 with the concave surface facing the object and a positive lens L4 having a strong convex curvature facing the image side.

The aspheric lens L1 of the first lens group G1 of the Example Embodiments 1–4 is an aspheric lens preferably made of plastic, most preferably made of acrylic resin. Moreover, the various aspheric lens L2 of the second lens group G2 in Example Embodiments 1–3 and the aspheric lens L2 of the second lens group G2 in Example Embodiment 4 are aspheric lenses preferably made of plastic, most preferably made of acrylic resin.

As shown in FIG. 1, the projection lens of Example Embodiment 1 comprises, on an optical axis AX and starting on the image side, a first lens group G1 with negative refractive power, an aperture A that serves as an aperture stop and controlling lens f-number and telecentricity, and a second lens group G2 having a positive refractive power. The first lens group G1 comprises a bi-aspheric negative meniscus lens L1 oriented with the concave surface directed toward the liquid-crystal display panel LC. The second lens group G2 comprises, beginning on the projection-screen side, a positive meniscus bi-aspheric lens L2 (bi-aspheric in that both lens surfaces are aspheric) with the concave surface facing the aperture A, a double-convex positive lens L3 with the stronger convex surface facing the object side, and a cemented lens including lenses L4, L5. The lens L4 is a negative meniscus lens L4 with the concave surface facing the object and a positive lens L5. The curvature of one surface of the lens L5 approximately matches the convex surface of the lens L4. The lenses L4 and L5 are placed so that the matching curves are cemented together or are in close proximity.

Table 1 shows numerical values specifying Example Embodiment 1. In Table 1, f is the focal length of the projection lens, F/ is the lens f-number, $2\omega$ is the angular diameter of the field of view (in degrees), $d_0$ is the axial distance between the image (projection screen) to the closest surface of the lens L1, L is the distance between the aperture A and the lens L3, and D is the distance between the lens L1 and the aperture A. All distances are in millimeters (mm). These parameter definitions are used to describe the other Example Embodiments as well.

Table 1 also specifies parameters of the individual lens elements. The first column of lens surface data specifies the lens surfaces in order starting from the image side; FIG. 1 shows the surface numbering. The second column "r" specifies the radius of curvature (mm) for each lens surface, the third column "d" provides data on the axial distance (mm) between adjacent lens surfaces, and the fourth and fifth columns "n" and "ν", respectively, are the refractive index (at 589.3 nm) and Abbe number, respectively, for each corresponding lens. The axial distances d and the indices of refraction n are for the thickness following the surface.

In addition, aspheric constants for the aspheric lens surfaces of lens L1 and L2 are provided. The aspheric surface shape is represented by Equation (4):

$$x = cs^2 \cdot (1 + \sqrt{1 - kc^2 s^2})^{-1} + \sum_{i=1}^{5} C_{2i} s^{2i} \quad (4)$$

In Equation (4), s is the distance to a point on a lens surface from an optical axis, x is the sag of the optical surface at the height s where sag is an axial distance from the apex of the surface to the point on the surface, k is a conic constant, c is the curvature of a standard spherical surface, and $C_{2i}$ (i=1, 2, 3, 4, 5) are aspheric coefficients corresponding to $s^{2i}$. The curvature c is the reciprocal of the radius of the spherical surface, $c = r^{-1}$.

Table 1 concludes with a list of other lens parameters and conditions such as the location of the aperture A and the focal lengths of the lens groups G1, G2. The ratios of various parameters needed to satisfy Conditions (2) and (3) above are also shown.

This information is set out for Example Embodiment 1 in Table 1; similar information for other Example Embodiments use the same format and the same parameter definitions.

TABLE 1

(Example Embodiment 1)
f = 22.92117 mm
F/ = 3.98
$2\omega$ = 76.8°
$d_0$ = 847.0 mm

| Surface No. | r (mm) | d (mm) | n | ν |
|---|---|---|---|---|
| 1 | 243.6674 | 2.0000 | 1.490840 | 57.07 |
| 2 | 20.1085 | 65.0000 | | |
| 3 | −33.0000 | 5.0000 | 1.490840 | 57.07 |
| 4 | −30.0000 | 6.0000 | | |
| 5 | 124.6687 | 17.0000 | 1.516800 | 64.10 |
| 6 | −33.7344 | 10.0000 | | |
| 7 | 104.4933 | 1.5000 | 1.805189 | 25.35 |
| 8 | 26.9614 | 17.0000 | 1.516800 | 64.10 |
| 9 | −87.7359 | 46.3758 | | |

Aspheric Constants
Note that k = 1.0 and $C_2 = C_{10}$ = 0.0 for all aspheric surfaces.

| Lens No. | Surface No. | $C_4$ | $C_6$ | $C_8$ |
|---|---|---|---|---|
| L1 | 1 | 4.18120 × 10⁻⁶ | −9.35470 × 10⁻¹¹ | 2.95350 × 10⁻¹² |
| | 2 | −7.01830 × 10⁻⁶ | −7.76410 × 10⁻⁹ | 2.89640 × 10⁻¹² |
| L2 | 3 | −7.22150 × 10⁻⁷ | −6.41680 × 10⁻⁹ | 1.96580 × 10⁻¹⁰ |
| | 4 | 8.98610 × 10⁻⁶ | 4.65680 × 10⁻⁸ | 1.47110 × 10⁻¹⁰ |

Other Parameters and Conditions

| | | |
|---|---|---|
| $f_1$ | = | −44.78433 mm |
| $f_2$ | = | 44.76231 mm |
| $f_{max}$ | = | 53.32395 mm |
| L | = | 33.8 mm |
| D | = | 42.2 mm |
| $|f_1/f_2|$ | = | 1.00 |
| $|f_{2max}/L|$ | = | 1.57763 |
| $D/|f_1|$ | = | 0.942 |

FIG. 2 shows Example Embodiment 2. Table 2 contains a numerical specification for Example Embodiment 2. The definition of symbols is the same as for Example Embodiment 1 of FIG. 1. Both surfaces of the lenses L1 and L2 are aspheric.

TABLE 2

(Example Embodiment 2)
f = 23.05314 mm
F/ = 3.32
2ω = 76.2°
$d_0$ = 847.0 mm

| Surface No. | r (mm) | d (mm) | n | ν |
|---|---|---|---|---|
| 1 | 92.3985 | 2.0000 | 1.490840 | 57.07 |
| 2 | 24.9425 | 55.3159 | | |
| 3 | −27.3668 | 5.0000 | 1.490840 | 57.07 |
| 4 | −24.8789 | 6.0000 | | |
| 5 | 177.9900 | 17.0000 | 1.516800 | 64.10 |
| 6 | −28.5371 | 10.0000 | | |
| 7 | 71.1470 | 1.5000 | 1.846672 | 23.82 |
| 8 | 24.5363 | 17.0000 | 1.516800 | 64.10 |
| 9 | −58.0667 | 29.7001 | | |

Aspheric Constants
Note that k = 1.0 and $C_2 = C_{10} = 0.0$ for all aspheric surfaces.

| Lens No. | Surface No. | $C_4$ | $C_6$ | $C_8$ |
|---|---|---|---|---|
| L1 | 1 | $2.96010 \times 10^{-6}$ | $2.46970 \times 10^{-9}$ | $4.30640 \times 10^{-13}$ |
| | 2 | $1.67120 \times 10^{-6}$ | $-8.34940 \times 10^{-9}$ | $3.41310 \times 10^{-11}$ |
| L2 | 3 | $9.25100 \times 10^{-6}$ | $-6.46160 \times 10^{-8}$ | $-1.29290 \times 10^{-10}$ |
| | 4 | $2.29460 \times 10^{-5}$ | $5.63260 \times 10^{-8}$ | $1.79980 \times 10^{-10}$ |

Other Parameters and Conditions

| | | |
|---|---|---|
| $f_1$ | = | −70.29183 mm |
| $f_2$ | = | 37.13099 mm |
| $f_{2max}$ | = | 48.96212 mm |
| L | = | 23.0 mm |
| D | = | 43.3159 mm |
| $|f_1/f_2|$ | = | 1.893 |
| $|f_{2max}/L|$ | = | 2.12879 |
| $D/|f_1|$ | = | 0.616 |

FIG. 3 shows Example Embodiment 3, similar to the Example Embodiments 1 and 2. Table 3 contains a numerical specification for Example Embodiment 3. The parameter definitions are the same as those used in the descriptions of Example Embodiments 1 and 2.

TABLE 3

(Example Embodiment 3)
f = 22.84027 mm
F/ = 4.17
2ω = 76.9°
$d_0$ = 847.0 mm

| Surface No. | r (mm) | d (mm) | n | ν |
|---|---|---|---|---|
| 1 | 673.8857 | 2.0000 | 1.490840 | 57.07 |
| 2 | 16.8044 | 62.5572 | | |
| 3 | −35.5898 | 5.0000 | 1.490840 | 57.07 |
| 4 | −32.3543 | 6.0000 | | |
| 5 | 87.1267 | 17.0000 | 1.464501 | 65.77 |
| 6 | −39.4225 | 10.0000 | | |
| 7 | 101.8354 | 1.5000 | 1.805189 | 25.35 |
| 8 | 30.1115 | 17.0000 | 1.464501 | 65.77 |
| 9 | −58.7438 | 58.4128 | | |

TABLE 3-continued (Example Embodiment 3)
f = 22.84027 mm
F/ = 4.17
2ω = 76.9°
$d_0$ = 847.0 mm Aspheric Constants
Note that k = 1.0 and $C_2 = C_{10} = 0.0$ for all aspheric surfaces.

| Lens No. | Surface No. | $C_4$ | $C_6$ | $C_8$ |
|---|---|---|---|---|
| L1 | 1 | $9.02260 \times 10^{-6}$ | $-4.88070 \times 10^{-10}$ | $5.23070 \times 10^{-12}$ |
| | 2 | $-1.27800 \times 10^{-5}$ | $7.31320 \times 10^{-9}$ | $-4.07910 \times 10^{-11}$ |
| L2 | 3 | $2.52930 \times 10^{-6}$ | $-6.01410 \times 10^{-9}$ | $-1.08410 \times 10^{-10}$ |
| | 4 | $8.18430 \times 10^{-6}$ | $-4.18320 \times 10^{-10}$ | $7.57700 \times 10^{-11}$ |

Other Parameters and Conditions

| | | |
|---|---|---|
| $f_1$ | = | −35.14679 mm |
| $f_2$ | = | 48.27943 mm |
| $f_{2max}$ | = | 61.03227 mm |
| L | = | 34.5 mm |
| D | = | 39.0572 mm |
| $|f_1/f_2|$ | = | 0.728 |
| $|f_{2max}/L|$ | = | 1.76905 |
| $D/|f_1|$ | = | 0.982 |

Figure 4:
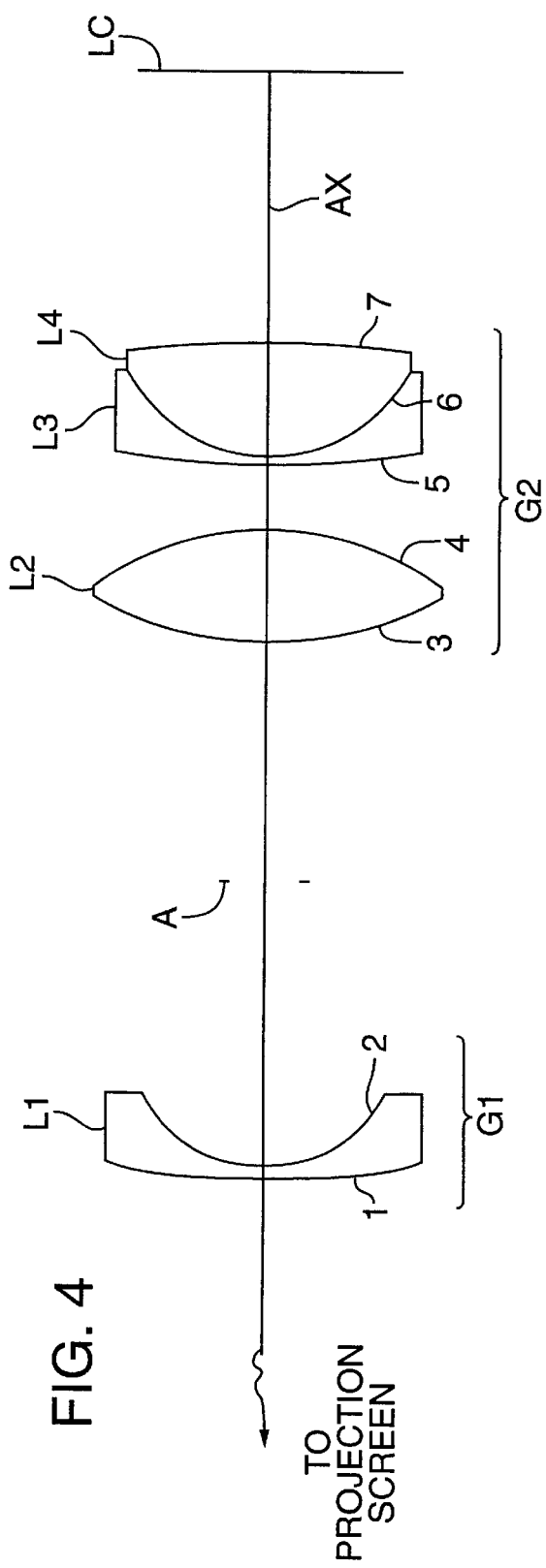
FIG. 4 is an optical diagram showing specific features of Example Embodiment 4.

FIG. 4 shows Example Embodiment 4. Example Embodiment 4 is similar to Example Embodiments 1–3 except that the meniscus element L2 of FIGS. 1–3 is not used. The first lens group G1 still comprises a bi-aspheric meniscus L1 just as in Example Embodiments 1–3. The second lens group G2 of Example Embodiment 4 comprises three lenses, L2, L3, and L4.

Table 4 contains a numerical specification for Example Embodiment 4. The parameter definitions are the same as for the three preceding Example Embodiments. All surfaces of the lenses L1 and L2 are aspheric.

TABLE 4

(Example Embodiment 4)
f = 22.92002 mm
F/ = 3.94
2ω = 76.7°
$d_0$ = 847.0 mm

| Surface No. | r (mm) | d (mm) | n | ν |
|---|---|---|---|---|
| 1 | 177.2329 | 2.0000 | 1.490840 | 57.07 |
| 2 | 19.4837 | 80.0716 | | |
| 3 | 43.5208 | 17.0000 | 1.490840 | 57.07 |
| 4 | −37.7998 | 10.0000 | | |
| 5 | 116.2438 | 1.5000 | 1.805189 | 25.35 |
| 6 | 23.9601 | 17.0000 | 1.589130 | 61.09 |
| 7 | −261.1596 | 41.1382 | | |

Aspheric Constants
Note that k = 1.0 and $C_2 = C_{10} = 0.0$ for all aspheric surfaces.

| Lens No. | Surface No. | $C_4$ | $C_6$ | $C_8$ |
|---|---|---|---|---|
| L1 | 1 | $1.50070 \times 10^{-6}$ | $5.57340 \times 10^{-9}$ | $1.06300 \times 10^{-12}$ |
| | 2 | $-6.95640 \times 10^{-6}$ | $-3.05220 \times 10^{-8}$ | $5.36680 \times 10^{-11}$ |

TABLE 4-continued (Example Embodiment 4)
f = 22.92002 mm
F/ = 3.94
2ω = 76.7°
$d_0$ = 847.0 mm

| L2 | 3 | $-4.52680 \times 10^{-6}$ | $2.95860 \times 10^{-9}$ | $-1.13580 \times 10^{-12}$ |
|---|---|---|---|---|
|    | 4 | $3.53930 \times 10^{-6}$  | $1.52250 \times 10^{-9}$ | $1.31110 \times 10^{-12}$  |

| Other Parameters and Conditions | | |
|---|---|---|
| $f_1$ | = | −44.78418 mm |
| $f_2$ | = | 44.77351 mm |
| $f_{2max}$ | = | 44.26040 mm |
| L | = | 37.0 mm |
| D | = | 43.0716 mm |
| $|f_1/f_2|$ | = | 1.000 |
| $|f_{2max}/L|$ | = | 1.19623 |
| $D/|f_1|$ | = | 0.962 |

Figure 7A:
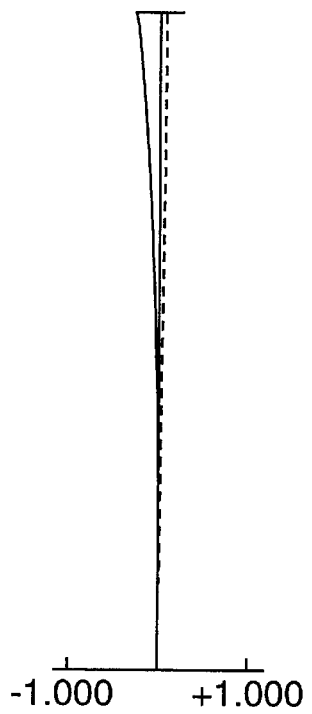
FIGS. 7A–7C provide plots of spherical aberration and offense against the sine condition (OSC), astigmatism, and distortion, respectively, for Example Embodiment 3.
Figure 7B:
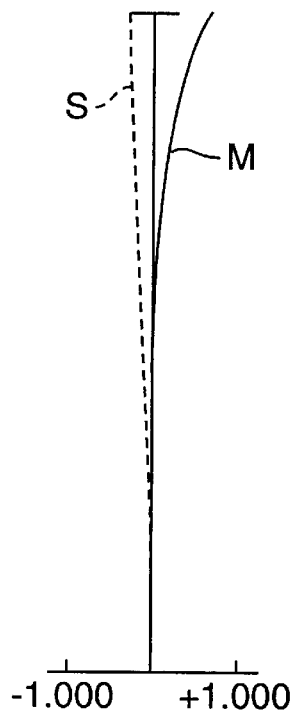
Figure 7C:
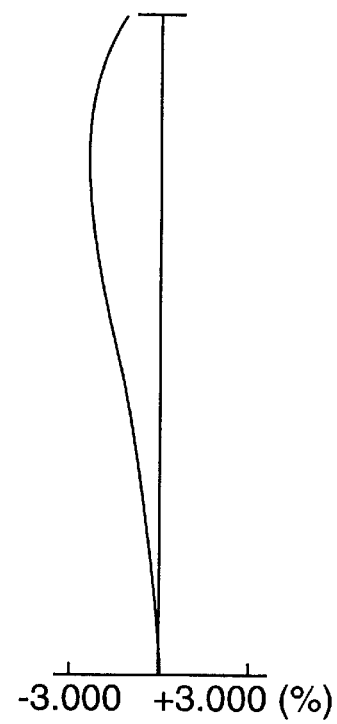
Figure 8A:
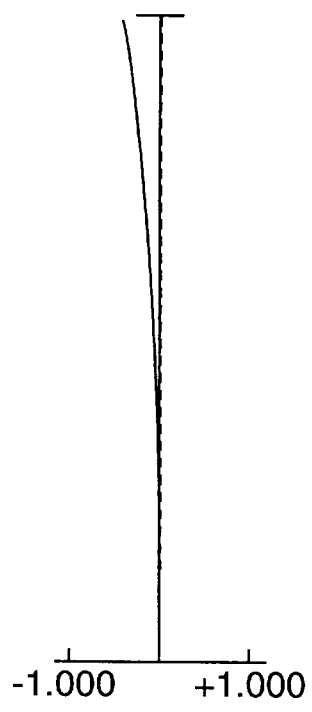
FIGS. 8A–8C provide plots of spherical aberration, astigmatism, and distortion, respectively, for Example Embodiment 4.
Figure 8B:
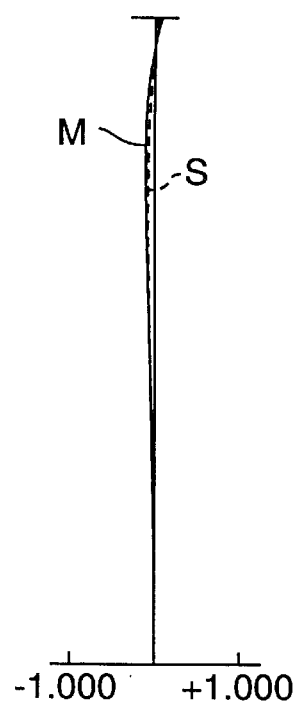
Figure 8C:
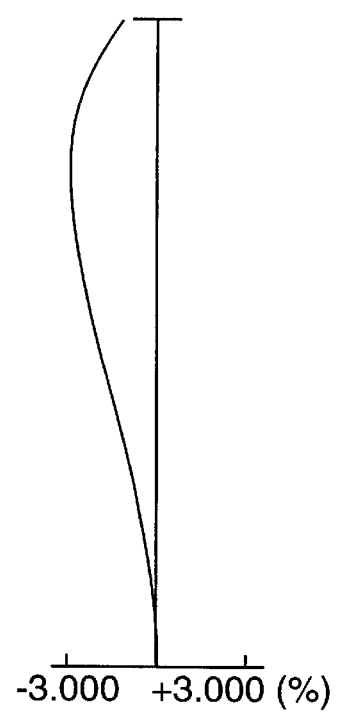

Aberration diagrams for Example Embodiments 1–4 are shown in FIGS. 5A–5C, 6A–6C, 7A–7C, and 8A–8C, respectively. In these aberration diagrams, NA is numerical aperture on the object side and Y is the height on the surface of the liquid-crystal panel LC (object height). The aberrations are plotted for a light wavelength of 587.6 nm. FIGS. 5A, 6A, 7A, and 8A depict spherical aberration (solid lines); FIGS. 5A and 7A also depict offense against the sine condition (OSC) (dashed lines). FIGS. 5B, 6B, 7B, and 8B depict astigmatism; the dashed lines denote tangential rays and the solid lines denote sagittal rays. FIGS. 5C, 6C, 7C, and 8C depict distortion. As is readily apparent from FIGS. 5A–5C, 6A–6C, 7A–7C, and 8A–8C, the projection lenses of Example Embodiments 1–4 exhibit excellent aberration correction. Example Embodiments 1–4 perform well over a wide field of view extending up to 77 degrees with back focal lengths in the range of 29.7 mm to 58.4 mm.

These Example Embodiments provide favorable optical performance over a wide field of view and are compact. Each of Example Embodiments 1, 2, and 3 has a cemented doublet including the lenses L4 and L5 of the second lens group G2. Example Embodiment 4 has a cemented doublet including the lenses L3 and L4. It is not necessary to cement the doublet; arranging the lenses in proximity is satisfactory.

Having illustrated and demonstrated the principles of the invention in Example Embodiments, it should be apparent to those skilled in the art that the Example Embodiments can be modified in arrangement and detail without departing from such principles. We claim as the invention all that comes within the scope of these claims.

What is claimed is:

1. A lens system for projecting an image produced by a display element onto a surface, the lens system comprising, on an optical axis in order from an image side:

(a) a first lens group comprising a first aspheric lens having a negative focal length $f_1$;

(b) an aperture;

(c) a second lens group having a positive focal length $f_2$, the second lens group comprising a positive lens $L_{2max}$ situated an axial distance L from the aperture and having a positive focal length $f_{2max}$ that is the smallest of all lenses of the second lens group;

(d) the lens system satisfying the conditions:

$0.5<|f_1/f_2|<2$, and $0.8<|f_{2max}/L|<2.5$.

2. The lens system of claim 1, wherein the first aspheric lens is bi-aspheric.

3. The lens system of claim 1, wherein the second lens group further comprises a second aspheric lens situated closer to the aperture than all other lenses of the second lens group.

4. The lens system of claim 3, wherein the second lens group further comprises, in order on the optical axis from the object side of the second aspheric lens, a lens having a negative focal length and a lens having a positive focal length.

5. The lens system of claim 1, wherein the second lens group further comprises, in order on the optical axis from the image side, a lens having a negative focal length and a lens having a positive focal length placed proximal to the lens having a negative focal length.

6. The lens system of claim 5, wherein the lens having a positive focal length is the lens $L_{2max}$.

7. The lens system of claim 6, wherein, in the second lens group, the lens having a negative focal length and the lens having a positive focal length are cemented together.

8. The lens system of claim 5, wherein, in the second lens group, the lens having a negative focal length and the lens having a positive focal length are cemented together.

9. The lens system of claim 1, wherein the positive lens $L_{2max}$ is a singlet.

10. The lens system of claim 1, wherein the positive lens $L_{2max}$ is part of a cemented doublet.

11. The lens system of claim 1, wherein the first aspheric lens is situated an axial distance D from the aperture, wherein $0.5<D/|f_1|<1.2$.

12. The lens system of claim 11, wherein the first aspheric lens is bi-aspheric.

13. The lens system of claim 12, wherein the second lens group further comprises, in order on the optical axis from the image side, a second aspheric lens situated closer to the aperture than all other lenses of the second lens group G2.

14. The lens system of claim 13, wherein:

the second aspheric lens is bi-aspheric; and the second lens group further comprises, in order on the optical axis from the object side of the second aspheric lens, a lens having a negative focal length and a first lens having a positive focal length situated in proximally to the lens having a negative focal length.

15. The lens system of claim 14, wherein, in the second lens group, the lens having a negative focal length is cemented to the first lens having a positive focal length to form a cemented doublet.

16. The lens system of claim 15, wherein the second lens group further comprises, on an optical axis and between the second aspheric lens and the cemented doublet, a second lens having a positive focal length.

17. The lens system of claim 1, wherein the second lens group further comprises, in order on the optical axis from the aperture:

a first lens having a positive focal length; and a lens having a negative focal length and a second lens having a positive focal length situated proximally to the lens having a negative focal length.

18. The lens system of claim 17, wherein, in the second lens group, the lens having a negative focal length is cemented to the second lens having a positive focal length.

19. The lens system of claim 18, wherein the first spheric lens is situated an axial distance D from the aperture and wherein $0.5<D/|f_1|<1.2$.

20. The lens system of claim 1, wherein the second lens group further comprises a cemented doublet situated closer to the display element than any other lens of the second lens group.

21. The lens system of claim 20, comprising no more than five lenses.

22. The lens system of claim 20, wherein the second lens group comprises a second aspheric lens that is situated closest to the aperture of all lenses of the second lens group, the second aspheric lens having a positive focal length that is shorter than all other lenses of the second lens group.

23. The lens system of claim 1, wherein the first lens group consists of one aspheric lens having a negative focal length.

24. A projection system for projecting an image of onto a viewing surface, the projection system comprising:

(a) a display element;

(b) an optical illumination system operable to direct illumination light from a light source to the display element;

(b) a projection lens operable to receive light from the display element and to project the light from the display element to the viewing surface, the projection lens comprising, on an optical axis in order from an image side a first lens group comprising a first aspheric lens having a negative focal length $f_1$;

an aperture;

a second lens group having a positive focal length $f_2$, the second lens group comprising a positive lens $L_{2max}$ situated an axial distance L from the aperture and having a positive focal length $f_{2max}$ that is the smallest of all lenses of the second lens group;

the lens satisfying the conditions $0.5<|f_1/f_2|<2$, and $0.8<|f_{2max}/L|<2.5$.

25. The projection system of claim 24, wherein the second lens group further comprises a cemented doublet situated closer to the display element than any other lens of the second lens group.

26. The projection system of claim 24, wherein:

the optical illumination system comprises first and second crossed-dichroic beamsplitters;

the display element comprises multiple transmission liquid-crystal panels each corresponding to a separate color component and each being situated proximally to the first crossed-dichroic beamsplitter, the first crossed-dichroic beamsplitter being operable to separate illumination light from the light source into separate color-component lights, and to direct the color-component lights individually to the respective transmission liquid-crystal panel, and each transmission liquid-crystal panel being operable to modulate the respective color-component light in response to an electrical-image signal supplied to the respective transmission liquid-crystal panel, to thereby produce a modulated light of the respective color-component light; and the second crossed-dichroic beamsplitter being operable to combine the modulated lights of the color components to thereby produce a combined modulated light that is directed to the projection lens.

27. The projection system of claim 25, wherein the optical illumination system comprises a polarizing beamsplitter operable to receive illumination light from the light source and to separate the illumination light into a first and a second polarization component; and the display element comprises a reflection liquid-crystal panel operable to receive the first polarization component from the polarizing beamsplitter, to modulate the first polarization component, and to reflect the modulated first polarization component back to the polarizing beamsplitter for delivery to the projection lens.

28. The projection system of claim 24, wherein:

the optical illumination system comprises a first polarizing beamsplitter operable to receive illumination light from the light source and to separate the illumination light into first and a second polarization components;

the display element comprises a first transmission liquid-crystal panel operable to receive and modulate the first polarization component and to produce a first optical modulation in response to luminance signals received by the transmission liquid-crystal panel, and a second transmission liquid-crystal panel operable to receive and modulate the second polarization component and to produce a second optical modulation in response to color signals received by the second transmission liquid-crystal panel; and the optical illumination system further comprises a second polarized light beamsplitter situated proximally to the first and second transmission liquid-crystal panels, the second polarized light beamsplitter being operable to receive the first and second optical modulations and to direct at least portions of the first and second optical modulations to the projection lens.

29. The lens system of claim 24, wherein the first lens group consists of one aspheric lens having a negative focal length.

* * * * *

UNITED STATES PATENT AND TRADEMARK OFFICE
CERTIFICATE OF CORRECTION

PATENT NO. : 5,822,128

DATED : October 13, 1998

INVENTOR(S) : ATUSHI SEKINE

It is certified that error appears in the above-indentified patent and that said Letters Patent is hereby corrected as shown below:

In the Specification:

Column 8, line 60, Table 1, "$f_{max}$" should be --$f_{2max}$--.

Signed and Sealed this

Second Day of November, 1999

Attest:

Q. TODD DICKINSON

Attesting Officer

Acting Commissioner of Patents and Trademarks